(12) United States Patent
Oyama et al.

(10) Patent No.: US 7,903,840 B2
(45) Date of Patent: Mar. 8, 2011

(54) IMAGE PROCESSING METHOD, IMAGE PROCESSING APPARATUS, IMAGE PROCESSING PROGRAM AND PROGRAM RECORDING MEDIUM

(75) Inventors: Hiroshi Oyama, Tokyo (JP); Makoto Maruya, Tokyo (JP)

(73) Assignee: NEC Toshiba Space Systems, Ltd., Tokyo (JP)

( * ) Notice: Subject to any disclaimer, the term of this patent is extended or adjusted under 35 U.S.C. 154(b) by 852 days.

(21) Appl. No.: 11/842,679

(22) Filed: Aug. 21, 2007

(65) Prior Publication Data
US 2008/0050012 A1 Feb. 28, 2008

(30) Foreign Application Priority Data

Aug. 22, 2006 (JP) ................................ 2006/225386

(51) Int. Cl.
*G06K 9/00* (2006.01)
(52) U.S. Cl. ........................................ 382/100; 382/154
(58) Field of Classification Search .................. 382/100, 382/154; 345/419–427; 356/12–18; 701/14, 701/120, 200–209; 340/975; 250/330; 244/3.2, 244/3.16, 177
See application file for complete search history.

(56) References Cited

U.S. PATENT DOCUMENTS

| 4,144,571 A | * | 3/1979 | Webber | 701/217 |
| 6,389,333 B1 | * | 5/2002 | Hansman et al. | 701/3 |
| 6,422,508 B1 | * | 7/2002 | Barnes | 244/3.16 |

FOREIGN PATENT DOCUMENTS

JP 2003-83745 A 3/2003

* cited by examiner

*Primary Examiner* — Samir A Ahmed
*Assistant Examiner* — Mehdi Rashidian
(74) *Attorney, Agent, or Firm* — Sughrue Mion, PLLC

(57) ABSTRACT

The present invention provides an image processing method which can search, at high speed, for image coordinates of a pixel corresponding to a position whose three-dimensional position is known, with respect to a line sensor image in which a surface of an object (i.e. the earth) is continuously taken by a line sensor mounted on a flight vehicle. The method includes calculating coordinates transformation information that is transformation information from an image coordinates system to a three-dimensional reference coordinates system for each line of a line sensor image, searching for a line where a distance between a line sensor view for each line that is calculated using flight vehicle three-dimensional coordinates position/speed information and the coordinates transformation information for each line of a line sensor image and a point whose three-dimensional position is known is smallest as the most suitable line corresponding to the point whose three-dimensional position is known on a three-dimensional coordinates, and determining a pixel where a distance between a straight line calculated by using flight vehicle three-dimensional coordinates position/speed information and the coordinates transformation information for each line with respect to each pixel on a line that is searched for as the most suitable line and the point whose three-dimensional position is known is smallest as image coordinates of a pixel on the line sensor image corresponding to the point whose three-dimensional position is known.

19 Claims, 14 Drawing Sheets

IMAGE PROCESSING METHOD, IMAGE PROCESSING APPARATUS, IMAGE PROCESSING PROGRAM AND PROGRAM RECORDING MEDIUM

RELATED APPLICATIONS

This application is based on Japanese Patent Application No. JP 2006-225386 filed on Aug. 22, 2006, and including a specification, claims, drawings and summary. The disclosure of the above Japanese Patent Application is incorporated herein by reference in its entirety.

BACKGROUND OF THE INVENTION

1. Field of the Invention

The present invention relates to an image processing method for processing an image of a ground surface which is detected by a line sensor installed on a flight vehicle.

2. Description of the Related Art

Japanese Patent Application Laid-Open No. 2003-83745 discloses an aerial triangulation using an image photographed from a flight vehicle (e.g. airplane, satellite). According to the document, a configuration is as follows. That is, an image obtained by three line sensors and position/posture information of a camera detected by a gyroscope, an inertial navigation device and a GPS satellite are recorded in recording means in a interrelated manner. The position/posture information of a camera is corrected by reducing a deviation between spatial position information corresponding to a reference point on a ground surface and an observation position which is obtained from the image and the position/posture information of a camera recorded in the recording means.

However, such technology above-described has a following problem. Referring to FIG. 1, a line sensor which continuously obtains a one-dimensional image and is installed in a flight vehicle (e.g. airplane, satellite, etc.) photographs a surface of the earth while flying (hereinafter, a two-dimensional image obtained by such photographing is referred to as "line sensor image").

A line 02 of a line sensor image 01 is an image of a photographing area 09 on a ground surface 11 which is photographed, within a sensor view 07, from a flight position 05 on a flight path 04 of a flight vehicle 100. Also, a line 03 is an image of a photographing area 10 on the ground surface 11 which is photographed from a flight position 06.

On the other hand, referring to FIG. 2, an area sensor (i.e. frame sensor) installed in a flight vehicle photographs a surface of the earth while flying (hereinafter, a two-dimensional image obtained by such photographing is referred to as "area sensor image"). An area sensor image 12 is obtained by photographing a photographing area 15 on the ground surface 11, within a sensor view 14, from a flight position 13 on a flight path 04. Therefore, the area sensor image 12 is an image of a surface of the earth which is photographed within a larger sensor view than the sensor view 07 of a line sensor image shown in FIG. 1.

Here, when a survey is performed, a located position of a point 08 whose three-dimensional position is known (hereinafter, referred to as "point P") in an image has to be identified. When the same area is photographed using an area sensor and a line sensor, a number of photographing times of an area sensor is smaller than that of a line sensor. Therefore, the identification of a position of the point P 08 in a line sensor image is difficult than the identification of a position of the point P 08 in an area sensor image.

In a case of a line sensor image, information associated with an image of the line 02 shown in FIG. 1 such as a photographing clock time, a flight position and a photographing posture differs from that of the line 03. Therefore, it is difficult to specify a line number and a column number (hereinafter, referred to as "image coordinates") of a point at which the point P 08 is photographed in a line sensor image 01. It is impossible to keep information of a flight position and a photographing posture with respect to all lines of the line sensor image 01.

On the other hand, in a case of an area sensor image, as shown in FIG. 2, the same flight position and photographing posture data can be applied to an image in the sensor field of view 14. Therefore, identifying a position of the point P 08 in a line sensor image is difficult in comparison with identifying a position of the point P 08 in an area sensor image.

As mentioned above, there is a problem of which a calculation of image coordinates of a pixel corresponding to the point P 08 using a line sensor image is difficult in comparison with that using an area sensor image.

SUMMARY OF THE INVENTION

The present invention was made to solve the foregoing and other exemplary problems, drawbacks, and disadvantages. A first exemplary feature of the present invention is to provide an image processing method which can search, at high speed, for image coordinates of a pixel on a line sensor image corresponding to a point whose three-dimensional position is known, with respect to a two-dimensional image obtained by photographing an object while a flight vehicle (e.g. airplane, satellite) mounting a line sensor which continuously obtains a one-dimensional image is flying.

In an exemplary embodiment, an image processing method of the present invention includes the following steps in an image processing which processes an image obtained by continuously taking an image of an object by using a line sensor mounted on a flight vehicle: calculating coordinates transformation information which is transformation information from an image coordinates system to a three-dimensional reference coordinates system for each line of a line sensor image; searching for a most suitable line on a line sensor image corresponding to a point whose three-dimensional position is known designated on a three-dimensional coordinates by using position information of the known position, information about a three-dimensional position and a speed of a flight vehicle for each line of a line sensor image and the above coordinates transformation information; and searching for image coordinates of a pixel on a line sensor image corresponding to the above known position by using the information of a most suitable line that is searched for, the information about a three-dimensional position and a speed of a flight vehicle for each line of a line sensor, and the above coordinates transformation information.

By performing a search as mentioned above, an image processing method of the present invention can calculate, at high speed, image coordinates of a pixel on a line sensor image corresponding to a point on a surface of the earth whose three-dimensional position is known.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Exemplary embodiments of the present invention will now be described in detail in accordance with the accompanying drawings.

In the following description, it is assumed for simplification that a position/posture of a flight vehicle is the same as that of a line sensor. When a position/posture of a flight vehicle is different from that of a line sensor, coordinates transformation of a position/posture may be performed between a flight vehicle and a line sensor.

The Feature of the Exemplary Embodiment of the Present Invention

The exemplary embodiment of the present invention has a feature to enable searching, at high speed, for image coordinates of a pixel on a line sensor image corresponding to a point P.

Figure 3:
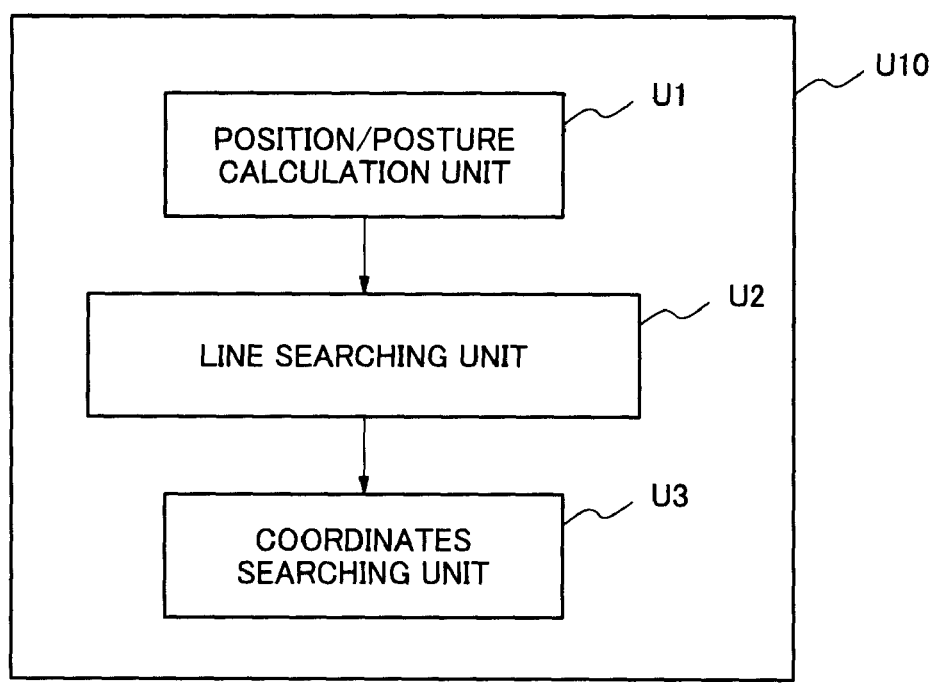
FIG. 3 is a block diagram showing an exemplary embodiment of an image processing apparatus of the present invention.

It will be described with reference to FIG. 3. FIG. 3 is a block diagram showing an exemplary embodiment of an image processing apparatus of the present invention that processes an image taken by a line sensor. An image processing apparatus U10 includes at least a position/posture calculation unit U1, a line searching unit U2 and a coordinates searching unit U3. The position/posture calculation unit U1 calculates position/posture information corresponding to each line of an image. The line searching unit U2 searches for a line corresponding to a point P in an image. The coordinates searching unit U3 searches for a coordinates corresponding to a point P in an image. Because the image processing apparatus U10 is configured as mentioned above, a calculation of image coordinates of a pixel on the line sensor image corresponding to a point P can be performed at high speed. Here, all of the position/posture calculation unit U1, the line searching unit U2 and the coordinates searching unit U3 or a part of them may be realized by a hardware logic, a computer program, or a combination of a hardware logic and a computer program, and it may be realized by using any other kind of means. An image processing program realized as a program may be recorded in a computer-readable program recording medium.

Figure 1:
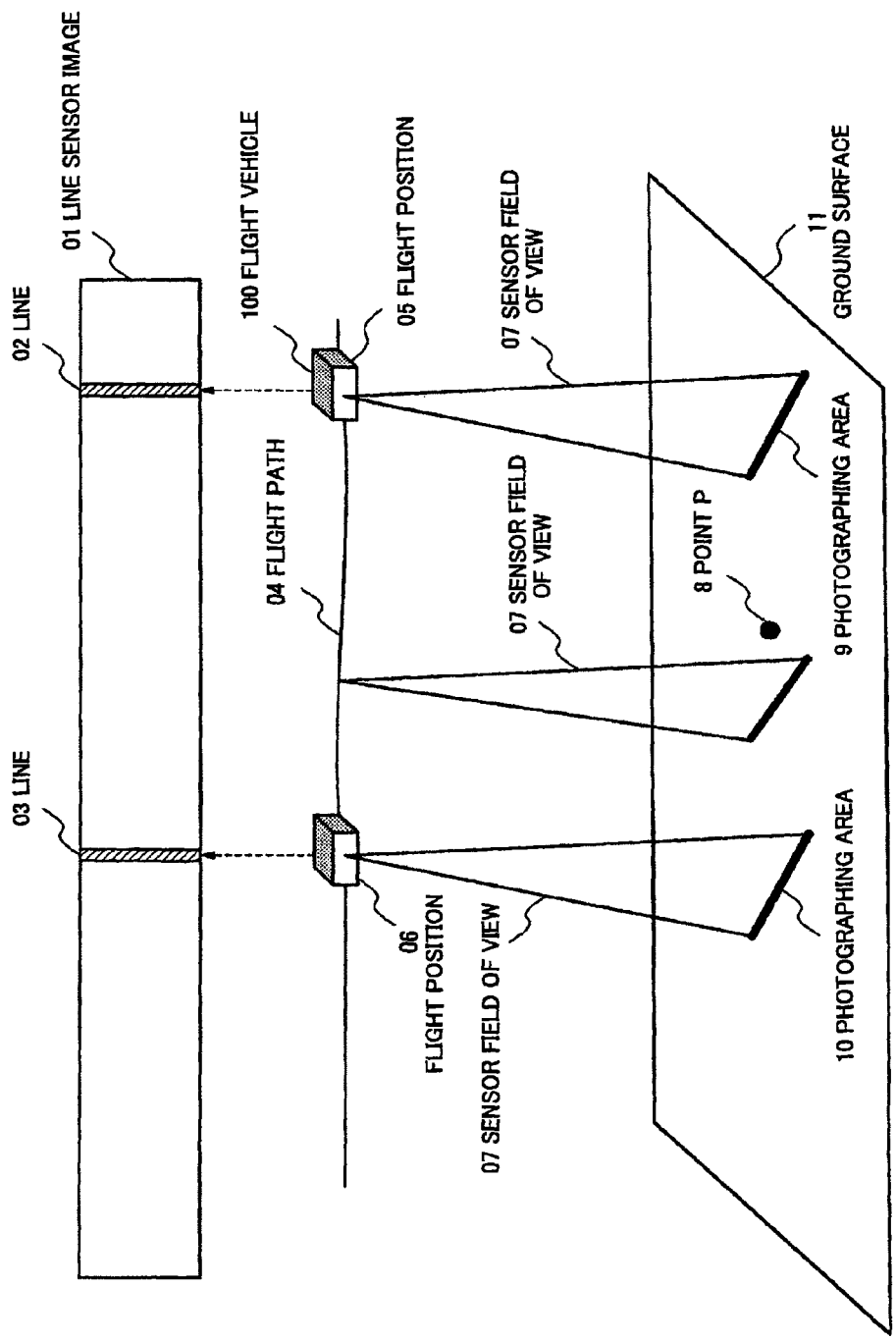
FIG. 1 is a figure for explaining a line sensor image.
Figure 2:
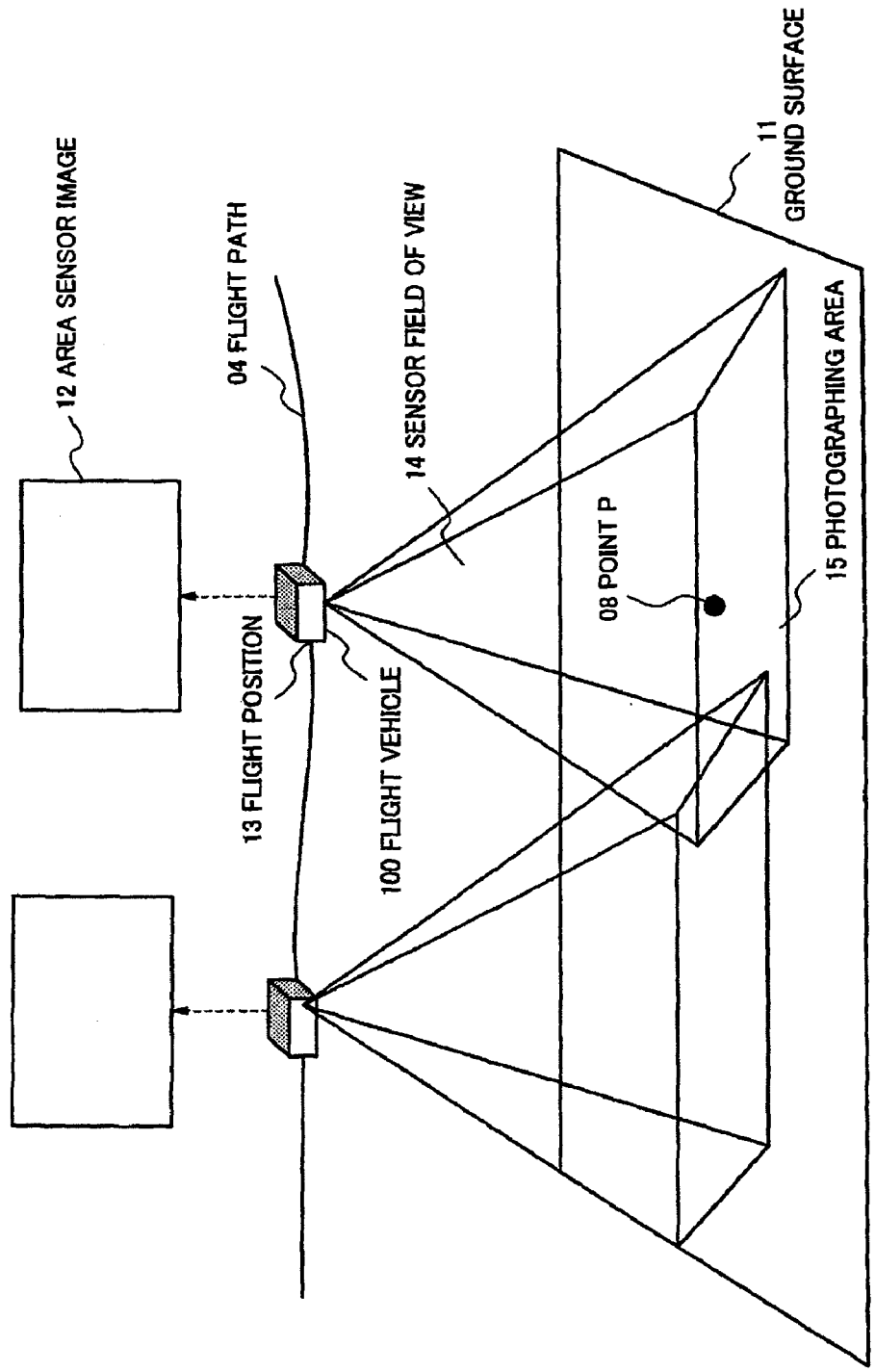
FIG. 2 is a figure for explaining an area sensor image.
Figure 4:
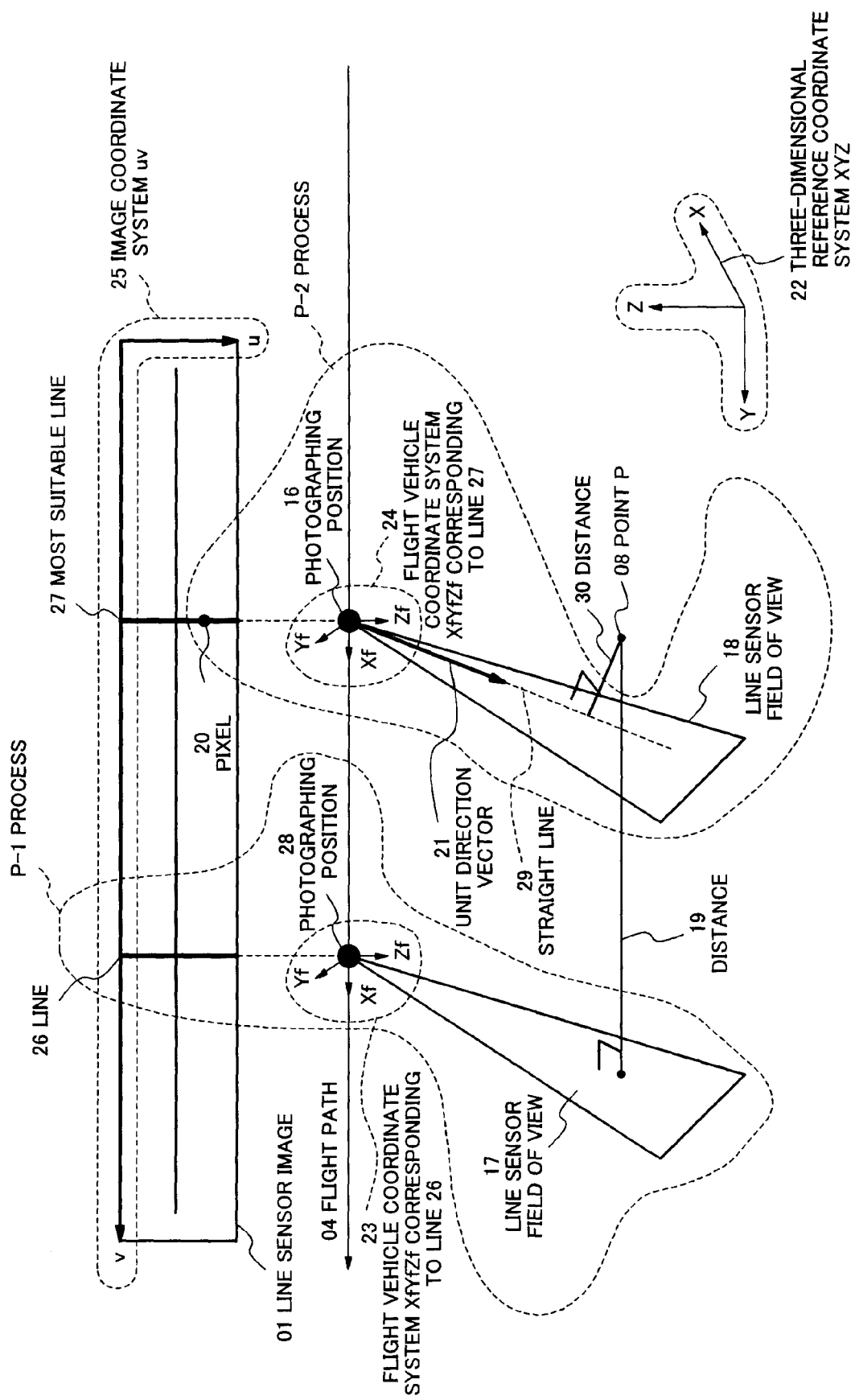
FIG. 4 is a figure for explaining an operation of calculating image coordinates of a pixel on a line sensor image corresponding to a point P in the image processing apparatus shown in FIG. 3.

When described more in detail, the position/posture calculation unit U1 calculates position/posture information corresponding to each line of an image based on information attached to a line sensor image. Here, the information attached to a line sensor image includes information of a photographing clock time for each line of an image, discrete three-dimensional position information of a flight vehicle and information of a posture of a flight vehicle. FIG. 4 is a figure for explaining an operation of calculating image coordinates of a pixel on a line sensor image corresponding to a point P in the image processing apparatus U10 shown in FIG. 1. Here, a three-dimensional position information and flight vehicle posture information corresponding to each line of a line sensor image are calculated by an interpolation processing based on posture information on a flight vehicle coordinates system XfYfZf 23 to a three-dimensional reference coordinates system XYZ 22.

The line searching unit U2 regards a line sensor view corresponding to a line of a line sensor image as a plane. The line searching unit U2 searches for a line where a distance between the plane and the point P 08 is the smallest (hereinafter, referred to as "the most suitable line").

An outline of an operation of the line searching unit will be described with reference to FIG. 4. The line searching unit U2 performs a process P-1 to a line 26 in the line sensor image 01 having an image coordinates system uv 25. In the process P-1, first, the line searching unit U2 calculates a distance 19 between a line sensor view 17 including a photographing position 28 corresponding to the line 26 for a target and the point P 08. The line searching unit U2 similarly performs a process to calculate the distances 19 for all lines in the line sensor image 01 and searches for a line where the distance 19 is smallest (in FIG. 4, a line where the distance 19 is smallest is shown as "the most suitable line 27"). Here, when a pixel corresponding to the point P 08 exists in the line sensor image 01, generally, the distance 19 monotonically decreases and then reaches a local minimum, and next, monotonically increases with an increase of a position coordinates (line number) of a line in the line sensor image 01. That is, there is a local minimum point for the distance 19. Therefore, by using this behavior, a line searching unit U2 can search for the most suitable line 27 at high speed.

The coordinates searching unit U3 determines, as a search range, the most suitable line 27 obtained by the line searching unit U2 and searches for a pixel. The pixel to be searched for is a pixel where a distance between the point P 08 and a straight line composed of a unit direction vector 21 corresponding to each pixel on the most suitable line 27 and a photographing position 16 corresponding to the most suitable line 27 is smallest.

An outline of an operation of the coordinates searching unit U3 will be described with reference to FIG. 4. The coordinates searching unit U3 performs a process P-2 to a pixel 20 on the most suitable line 27. In the process P-2, the coordinates searching unit U3 calculates the unit direction vector 21 corresponding to the pixel 20. Moreover, the coordinates searching unit U3 searches for image coordinates where a distance 30 between the point P 08 and a straight line 29 composed of the photographing position 16 and the unit direction vector 21 is smallest. The distance 30 usually monotonically decreases and then reaches a local minimum, and next, monotonically increases with an increase of a position coordinates (column number) of a pixel on the most suitable line 27 during a search. Therefore, by using this behavior, the coordinates searching unit U3 can search for image coordinates of a pixel on the line sensor image corresponding to the point P 08 at high speed.

The Composition of the Exemplary Embodiment

Figure 5:
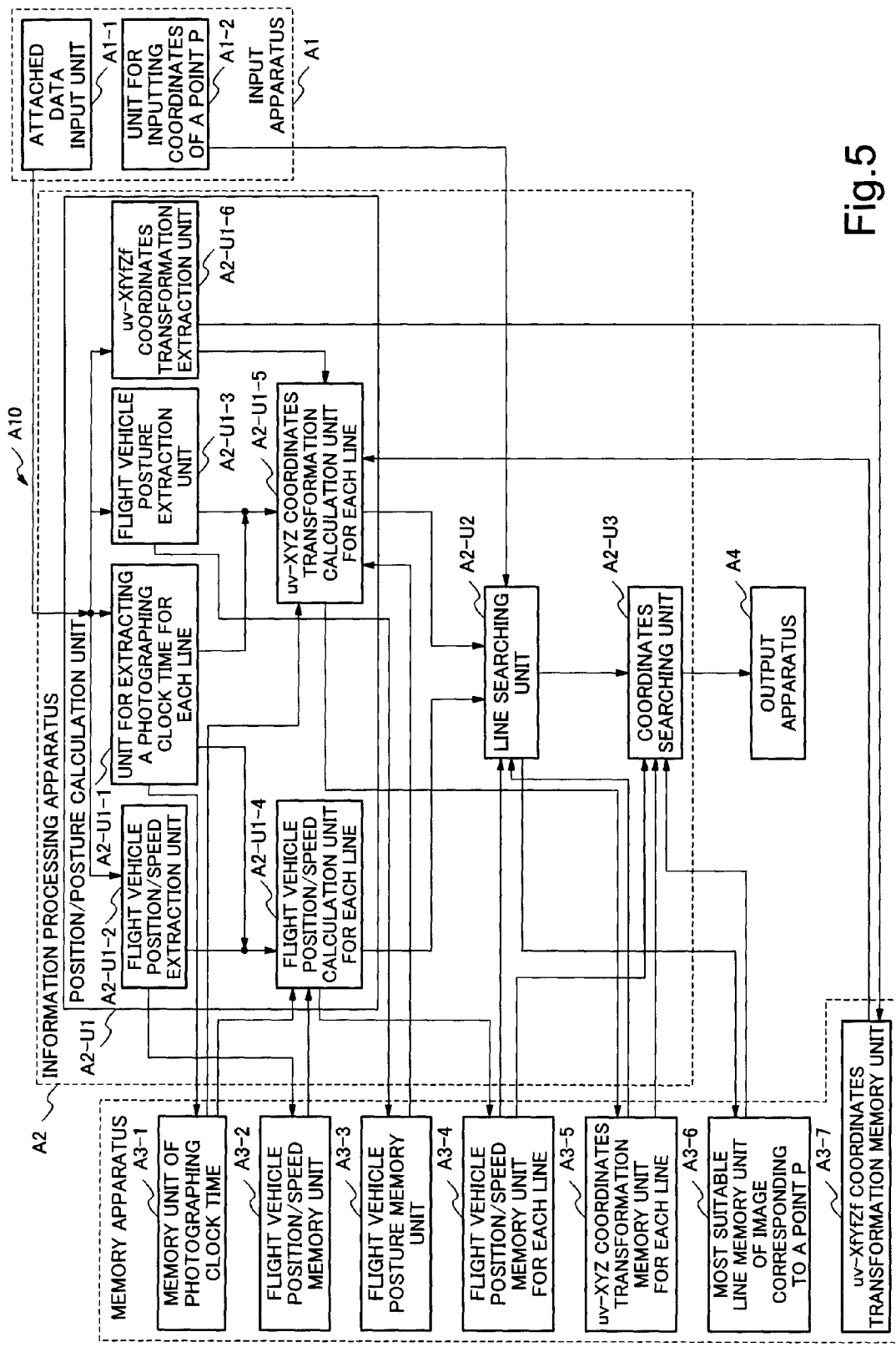
FIG. 5 is a block diagram showing an example of a detailed structure of an exemplary embodiment of an image processing apparatus of the present invention.

FIG. 5 is a block diagram showing an example of a detailed structure of an exemplary embodiment of an image processing apparatus of the present invention. Referring to FIG. 5, an image processing apparatus A10 of the exemplary embodiment performs, by a program logic, an image processing to an image taken by a line sensor. The image processing apparatus A10 includes at least an input apparatus A1 such as a keyboard, an information processing apparatus A2 which is operated by a program control, a memory apparatus A3 which memorizes information and an output apparatus A4 such as a display apparatus. However, as mentioned above, an image taken by a line sensor may be processed by a hardware logic or it may be processed by a combination of a program logic and a hardware logic. Additionally, an image taken by a line sensor may be processed by using any other kind of image processing methods.

The input apparatus A1 includes an attached data input unit A1-1 and a unit for inputting coordinates of a point P A1-2.

The information processing apparatus A2 includes at least a position/posture calculation unit A2-U1 (that is, the position/posture calculation unit U1 shown in FIG. 3), a line searching unit A2-U2 (that is, the line searching unit U2 shown in FIG. 3) and a coordinates searching unit A2-U3 (that is, the coordinates searching unit U3 shown in FIG. 3).

Additionally, the position/posture calculation unit A2-U1 includes at least a unit for extracting a photographing clock time for each line A2-U1-1, a flight vehicle position/speed extraction unit A2-U1-2, a flight vehicle posture extraction unit A2-U1-3, a flight vehicle position/speed calculation unit for each line A2-U1-4, a uv-XYZ coordinates transformation calculation unit for each line A2-U1-5 and a uv-XfYfZf coordinates transformation extraction unit A2-U1-6.

The memory apparatus A3 includes at least a memory unit of a photographing clock time A3-1, a flight vehicle position/speed memory unit A3-2, a flight vehicle posture memory unit A3-3, a flight vehicle position/speed memory unit for each line A3-4, a uv-XYZ coordinates transformation memory unit for each line A 3-5, a most suitable line memory unit of image corresponding to a point P A3-6 and a uv-XfYfZf coordinates transformation memory unit A 3-7.

Here, the unit for extracting a photographing clock time for each line A2-U1-1 extracts information of a photographing clock time corresponding to an image of each line from attached data of a line sensor image which is given by the attached data input unit A1-1 and then supplies the information of a photographing clock time to the memory unit of a photographing clock time A3-1. The memory unit of a photographing clock time A3-1 stores the information of a photographing clock time.

An attached data of a line sensor image which is given by the attached data input unit A1-1 includes information such as three-dimensional position/speed information/posture information of a flight vehicle for each predetermined time interval, information of a photographing clock time for each image line, and uv-XfYfZf coordinates transformation information.

Here, the uv-XfYfZf coordinates transformation information is coordinates transformation information between a uv (image coordinates system) and a XfYfZf (flight vehicle coordinates system).

The flight vehicle position/speed extraction unit A2-U1-2 extracts three-dimensional position/speed information of a flight vehicle for each predetermined time interval and the time from attached data of a line sensor image which is given by the attached data input unit A1-1. After that, the flight vehicle position/speed extraction unit A2-U1-2 supplies the three-dimensional position/speed information and the time that are extracted to the flight vehicle position/speed memory unit A3-2. The flight vehicle position/speed memory unit A3-2 stores the three-dimensional position/speed information and the time.

The flight vehicle posture extraction unit A2-U1-3 extracts posture information of a flight vehicle for each predetermined time interval and the time from attached data of a line sensor image which is given by the attached data input unit A1-1. After that, the flight vehicle posture extraction unit A2-U1-3 supplies the posture information and the time that are extracted to the flight vehicle posture memory unit A3-3. The flight vehicle posture memory unit A3-3 stores the posture information and the time.

The uv-XfYfZf coordinates transformation extraction unit A2-U1-6 extracts uv-XfYfZf coordinates transformation information from attached data of a line sensor image which is given by the attached data input unit A1-1. After that, the uv-XfYfZf coordinates transformation extraction unit A2-U1-6 supplies the extracted uv-XfYfZf coordinates transformation information to the uv-XfYfZf coordinates transformation memory unit A3-7. The uv-XfYfZf coordinates transformation memory unit A3-7 stores the uv-XfYfZf coordinates transformation information.

Information of a photographing clock time corresponding to a line sensor image for each line is stored in the memory unit of a photographing clock time A3-1. Three-dimensional position/speed information of a flight vehicle for each predetermined time interval is stored in the flight vehicle position/speed memory unit A3-2. The flight vehicle position/speed calculation unit for each line A2-U1-4 calculates three-dimensional position and speed information of a flight vehicle corresponding to each line by an interpolation method using the information of a photographing clock time corresponding to a line sensor image for each line and three-dimensional position/speed information of a flight vehicle for each predetermined time interval. The flight vehicle position/speed calculation unit for each line A2-U1-4 supplies the three-dimensional position and speed information of a flight vehicle for each line that are calculated to the flight vehicle position/speed memory unit for each line A3-4 for each line. As a result, the flight vehicle position/speed memory unit for each line A3-4 stores the three-dimensional position and speed information of a flight vehicle corresponding to each line of a line sensor image.

The uv-XYZ coordinates transformation calculation unit for each line A2-U1-5 calculates uv-XYZ coordinates transformation information corresponding to each line by an interpolation method using the information of a photographing clock time corresponding to each line stored in the memory unit of a photographing clock time A3-1, the flight vehicle posture information for each predetermined time interval stored in the flight vehicle posture memory unit A3-3 and the uv-XfYfZf coordinates transformation information stored in the uv-XfYfZf coordinates transformation memory unit A3-7. Here, the uv-XYZ coordinates transformation information is coordinates transformation information between a uv (image coordinates system) and an XYZ (three-dimensional reference coordinates system).

The uv-XYZ coordinates transformation calculation unit for each line A2-U1-5 supplies the calculated uv-XYZ coordinates transformation information corresponding to each line to the uv-XYZ coordinates transformation memory unit for each line A3-5. The uv-XYZ coordinates transformation memory unit for each line A3-5 stores the uv-XYZ coordinates transformation information corresponding to each line.

The line searching units A2-U2 searches for the most suitable line of a line sensor image corresponding to the point P 08. Position information of the point P is given by the unit for inputting coordinates of a point P A1-2 as a point whose three-dimensional position is known. Three-dimensional position/speed information of a flight vehicle corresponding to each line is stored in the flight vehicle position/speed memory unit for each line A3-4. The uv-XYZ coordinates transformation information corresponding to each line is stored in the uv-XYZ coordinates transformation memory unit for each line A3-5. The line searching units A2-U2 searches for the most suitable line of a line sensor image corresponding to a point P specified by three-dimensional coordinates using the position information of the point P, the three-dimensional position/speed information of a flight vehicle corresponding to each line and the uv-XYZ coordinates transformation information corresponding to each line. The line searching unit A2-U2 supplies the information of the most suitable line of a line sensor image to the most suitable line memory unit of image corresponding to a point P A3-6. The most suitable line memory unit of image corresponding to a point P A3-6 stores the information of the most suitable line of a line sensor image.

The coordinates searching unit A2-U3 calculates image coordinates of a pixel on a line sensor image corresponding to a point P using the information of the most suitable line corresponding to a point P stored in the most suitable line memory unit of image corresponding to a point P A3-6, the three-dimensional position/speed information of a flight vehicle corresponding to each line stored in the flight vehicle position/speed memory unit for each line A3-4 and the uv-XYZ coordinates transformation information corresponding to each line stored in the uv-XYZ coordinates transformation memory unit for each line A3-5. The coordinates searching unit A2-U3 supplies the calculated image coordinates of a pixel on a line sensor image corresponding to a point P to the output apparatus A4. The output apparatus A4 outputs the image coordinates of a pixel on a line sensor image corresponding to a point P.

Description of Operation of an Exemplary Embodiment

Usually, a photographing clock time and a time interval extracted by the unit for extracting a photographing clock time for each line A2-U1-1 are not consistent with a time sampled and a sampling interval at which three-dimensional position/speed information of a flight vehicle is extracted by the flight vehicle position/speed extraction unit A2-U1-2 and posture information of a flight vehicle is extracted by the flight vehicle posture extraction unit A2-U1-3. Accordingly, as described in FIG. 5, in order to increase efficiency of a process, three-dimensional position/speed information of a flight vehicle corresponding to each line of a line sensor image and coordinates transformation information have to be calculated, in advance, by the flight vehicle position/speed calculation unit for each line A2-U1-4 and the uv-XYZ coordinates transformation calculation unit for each line A2-U1-5.

Figure 6:
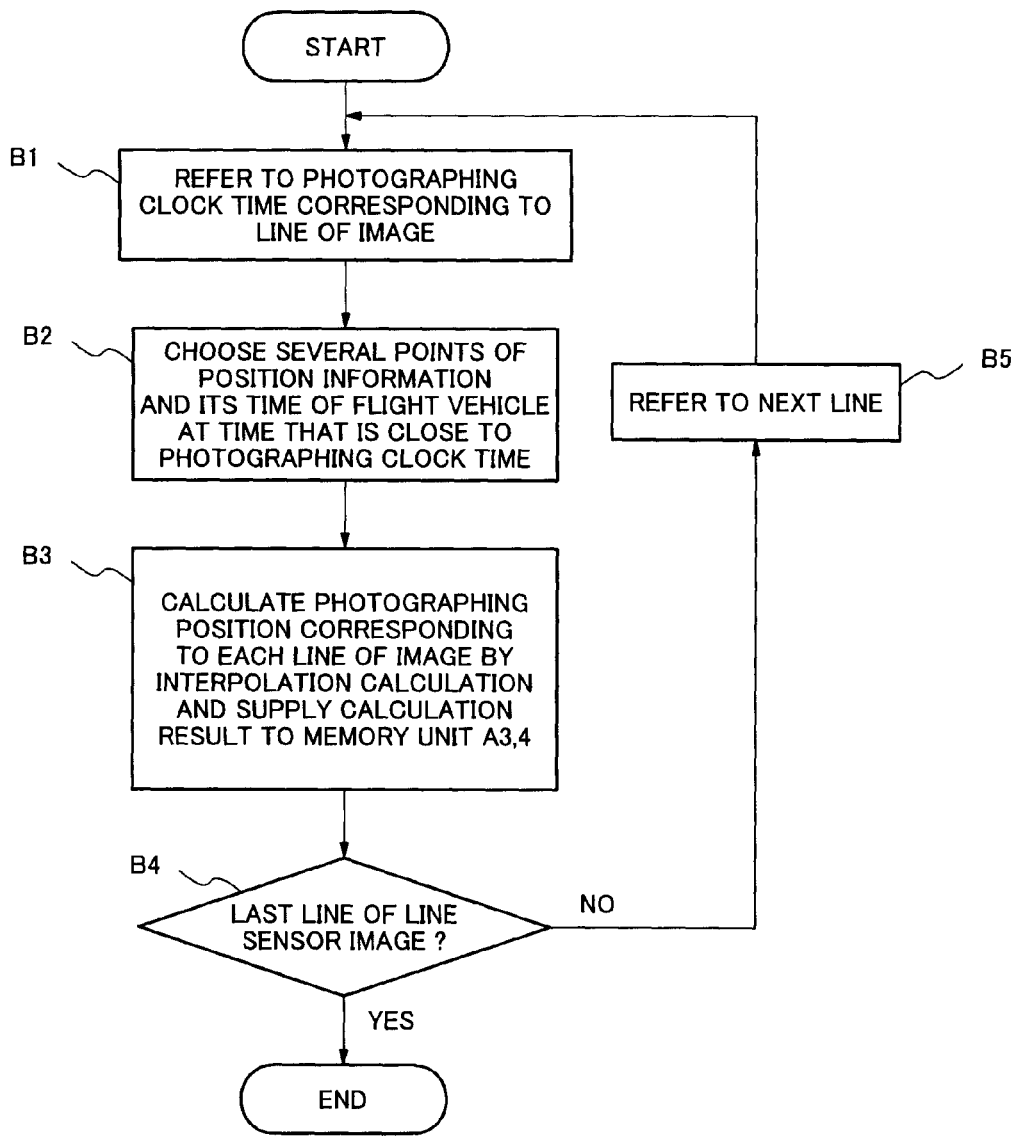
FIG. 6 is a flowchart for explaining an example of an operation of a flight vehicle position/speed calculation unit for each line of the image processing apparatus shown in FIG. 5.
Figure 7:
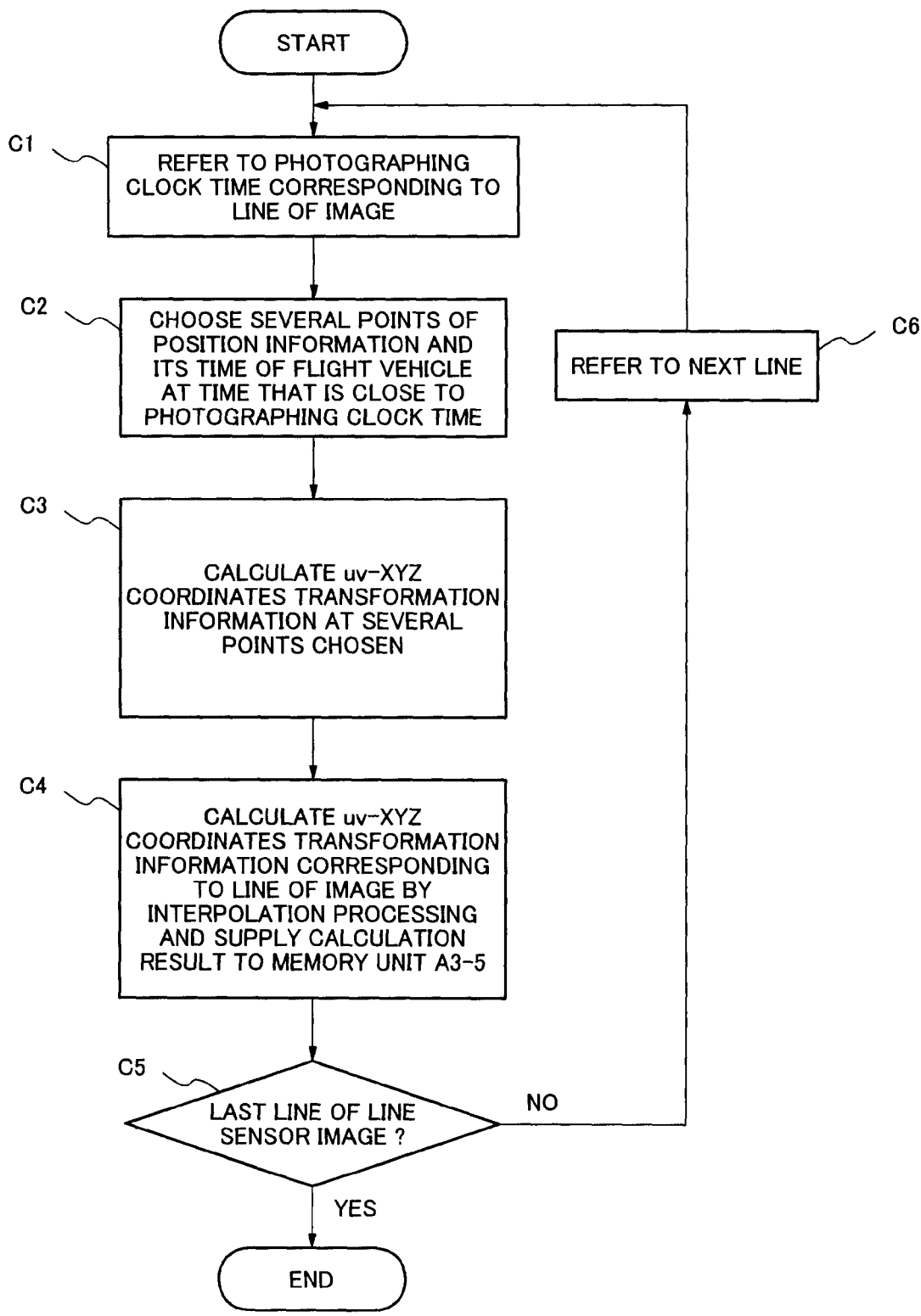
FIG. 7 is a flowchart for explaining an example of an operation of a uv-XYZ coordinates transformation information calculation unit for each line of the image processing apparatus shown in FIG. 5.

Next, the flight vehicle position/speed calculation unit for each line A2-U1-4 will be described with reference to FIG. 5 and FIG. 6. Also, the uv-XYZ coordinates transformation calculation unit for each line A2-U1-5 will be described with reference to FIG. 5 and FIG. 7. Here, FIG. 6 is a flowchart for explaining an example of an operation of the flight vehicle position/speed calculation unit for each line A2-U1-4. FIG. 7 is a flowchart for explaining an example of an operation of the uv-XYZ coordinates transformation calculation unit for each line A2-U1-5.

First, an example of an operation of the flight vehicle position/speed calculation unit for each line A2-U1-4 is described with reference to a flowchart shown in FIG. 6. First, the flight vehicle position/speed calculation unit for each line A2-U1-4 refers to information of a photographing clock time of an image for each line stored in the memory unit of a photographing clock time A3-1 shown in FIG. 5 (step B1). Next, the flight vehicle position/speed calculation unit for each line A2-U1-4 chooses several clock times that are close to a time shown by information of a photographing clock time that is referred to in step B1 and position/speed information from the three-dimensional position/speed information of a flight vehicle (information for each predetermined time interval) stored in the flight vehicle position/speed memory unit A3-2 (step B2).

Next, the flight vehicle position/speed calculation unit for each line A2-U1-4 calculates a photographing position (three-dimensional position) and a speed of a flight vehicle at a photographing clock time corresponding to each line of a line sensor image, by an interpolation processing, based on the several points of position/speed information chosen in step B2, and supplies the calculated three-dimensional position/speed information of a flight vehicle corresponding to each line to the flight vehicle position/speed memory unit for each line A3-4 (step B3).

Finally, the flight vehicle position/speed calculation unit for each line A2-U1-4 confirms whether or not a process reaches the last line of a line sensor image (step B4). When a process does not yet reach the last line ("No" decision in step B4), the flight vehicle position/speed calculation unit for each line A2-U1-4 changes its state to a state in which the following line is referred to (step B5) and then returns to step B1.

After that, the flight vehicle position/speed calculation unit for each line A2-U1-4 repeats processes from step B1 to step B5.

When the process reaches the last line in step B4 ("Yes" decision in step B4), the flight vehicle position/speed calculation unit for each line A2-U1-4 finishes a process.

Next, an operation of the uv-XYZ coordinates transformation calculation unit for each line A2-U1-5 will be described using a flowchart shown in FIG. 7. The uv-XYZ coordinates transformation calculation unit for each line A2-U1-5 refers to the information of a photographing clock time corresponding to each line of a line sensor image stored in the memory unit of a photographing clock time A3-1 shown in FIG. 5 (step C1). Next, the uv-XYZ coordinates transformation calculation unit for each line A2-U1-5 chooses several clock times that are close to a time shown by information of a photographing clock time that has been referred to in step C1 and posture information from the flight vehicle posture information stored in the flight vehicle posture memory unit A3-3 (step C2).

Next, the uv-XYZ coordinates transformation calculation unit for each line A2-U1-5 calculates uv-XYZ coordinates transformation information for several points that have been chosen using several points of posture information chosen in step C2 and the uv-XfYfZf coordinates transformation information stored in the uv-XfYfZf coordinates transformation memory unit A3-7 (step C3).

Next, the uv-XYZ coordinates transformation calculation unit for each line A2-U1-5 calculates the uv-XYZ coordinates transformation information corresponding to each line of a line sensor image at a photographing clock time that is referred to, by an interpolation processing, using several points of uv-XYZ coordinates transformation information calculated in step C3 (step C4). The uv-XYZ coordinates transformation calculation unit for each line A2-U1-5 supplies the calculated uv-XYZ coordinates transformation information corresponding to each line of a line sensor image to the uv-XYZ coordinates transformation memory unit for each line A3-5.

Finally, the uv-XYZ coordinates transformation calculation unit for each line A2-U1-5 confirms whether or not a process reaches the last line of a line sensor image (step C5). When a process does not yet reach the last line ("No" decision in step C5), the uv-XYZ coordinates transformation information calculation unit for each line A2-U1-5 changes its state to a state in which the following line is referred to (step C6) and then returns to step C1. After that, it repeats processes from step C1 to step C6.

When a process has already reached the last line in step C5 ("Yes" decision in step C5), the uv-XYZ coordinates transformation calculation unit for each line A2-U1-5 stops processing at a time when a process reaches the last line.

Figure 8:
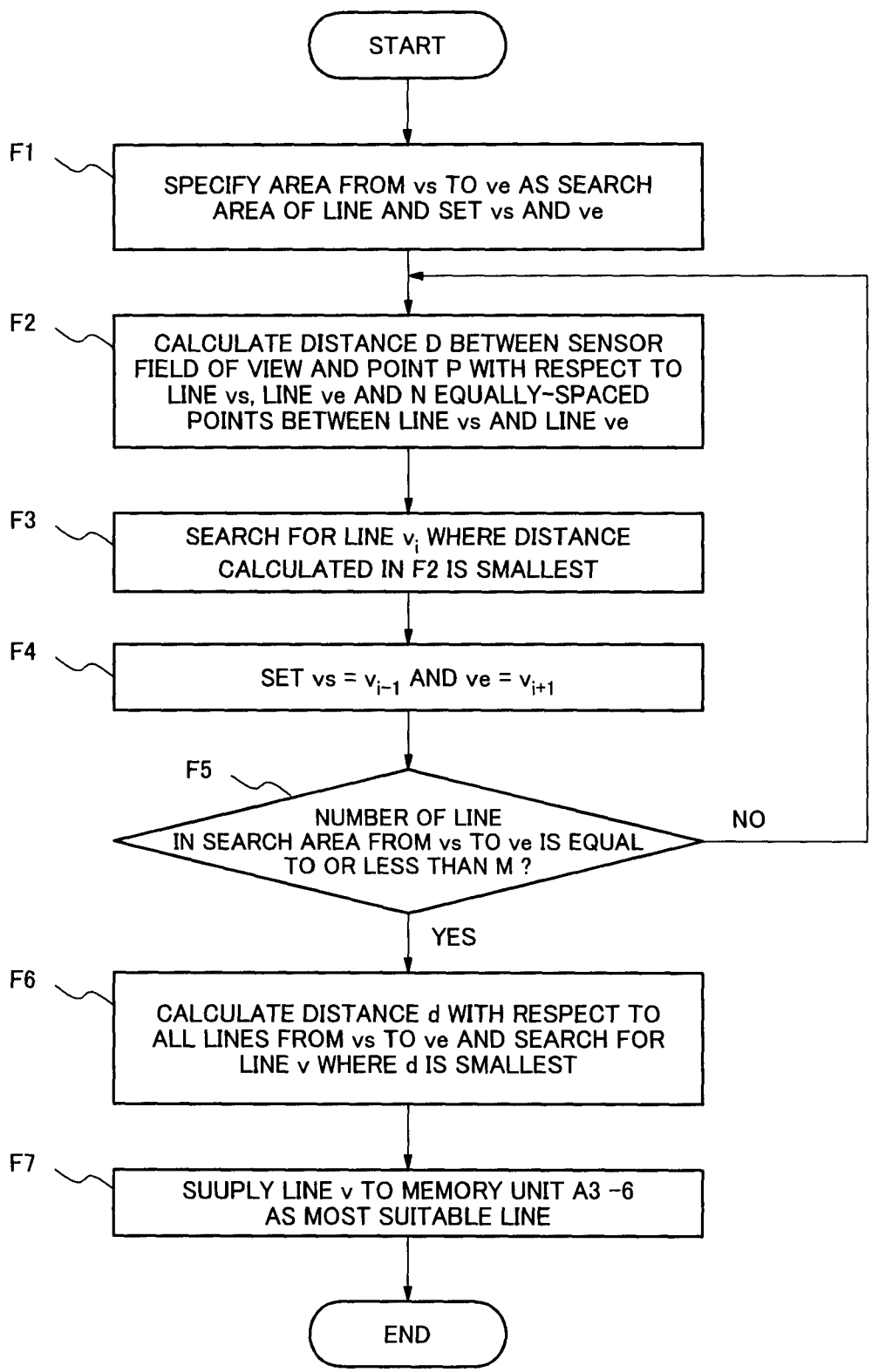
FIG. 8 is a flowchart for explaining an example of an operation of a line searching unit of the image processing apparatus shown in FIG. 5.

After a process of the flight vehicle position/speed calculation unit for each line A2-U1-4 and a process of the uv-XYZ coordinates transformation calculation unit for each line A2-U1-5 have been completed, the line searching unit A2-U2 performs a process to search for the most suitable line of a line sensor image corresponding to a point P. As mentioned above, a distance between a sensor view corresponding to each line of a line sensor image and a point P monotonically decreases and then reaches a local minimum, and next, monotonically increases with an increase of a position coordinates (line number) of a line in the line sensor image during a search. Based on such aspect, an example of an operation of the line searching unit A2-U2 is in detail described with reference to FIG. 8 and FIG. 10. FIG. 8 is a flowchart for explaining an example of an operation of the line searching unit A2-U2.

Figure 10:
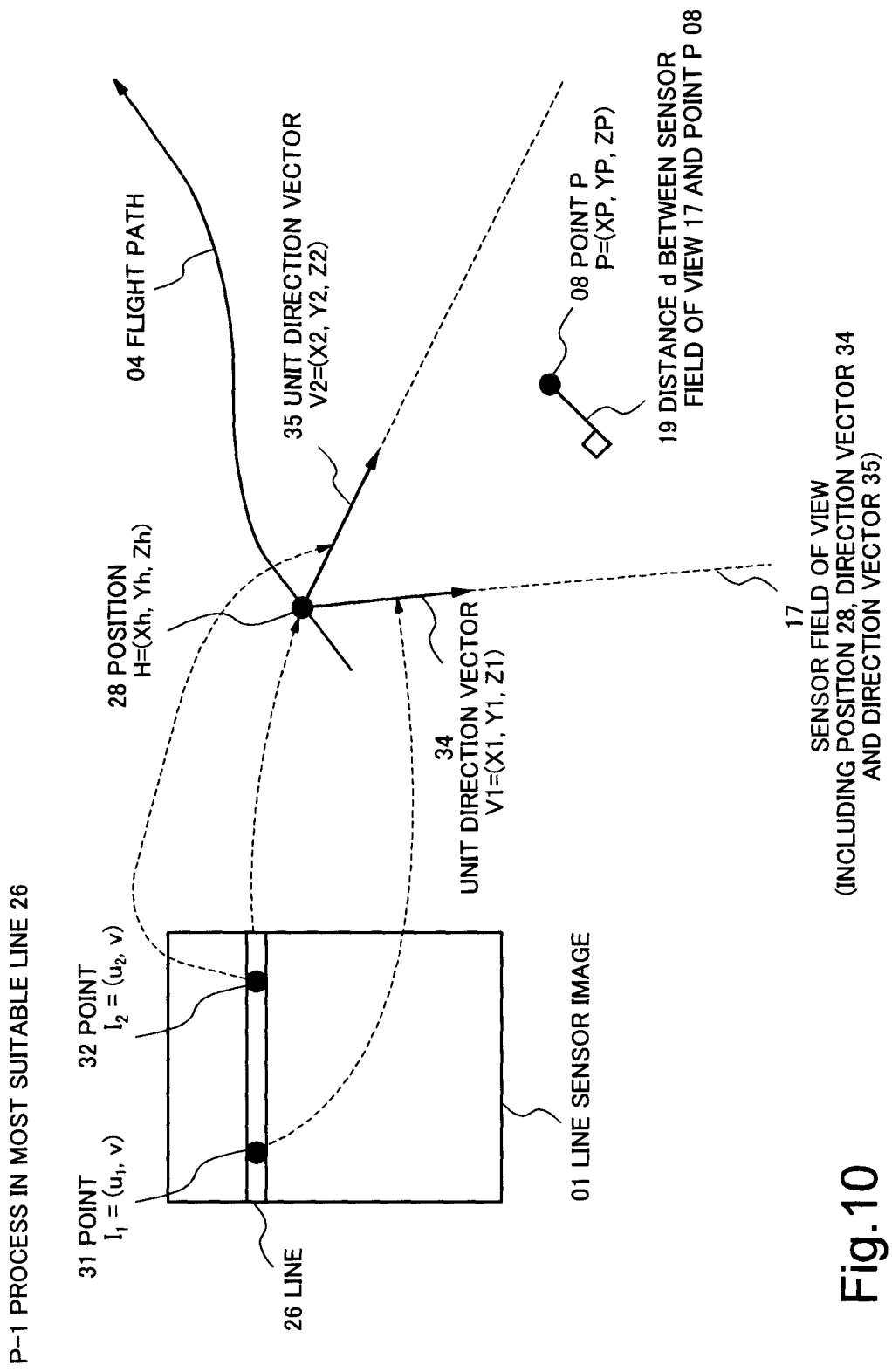
FIG. 10 is a figure for explaining an operation of a process P-1 in a line shown in FIG. 4 as an example of searching for a most suitable line of a line sensor image corresponding to a point P.

FIG. 10 shows an example of searching for the most suitable line of a line sensor image corresponding to a point P and shows an operation of a process P-1 in the line 26 shown in FIG. 4.

In a flowchart shown in FIG. 8, first, the line searching unit A2-U2 determines an area where a line of a line sensor image is searched for. That is, the line searching unit A2-U2 determines, as a search area, an area from a minimum line number vs of a line of an image to a maximum line number ve of a line of an image. The line searching unit A2-U2 allocates the vs to 1 and allocates the ve to the number of lines of a line sensor image (step F1). Next, the line searching unit A2-U2 equally divides the search area into N (N is an integer and larger than 0) areas. The line searching unit A2-U2 allocates the line vs to be first searched to $v_1$. The line searching unit A2-U2 allocates the line ve to be last searched to $V_{N+1}$. The line searching unit A2-U2 allocates lines between the line vs and the line ve to $v_2$ through $v_N$, respectively. Here, the $v_1$ to $v_{N+1}$ have a relationship of $v_1 < v_2 < v_3 < \ldots < v_N < v_{N+1}$. There are (N+1) lines in total. The line searching unit A2-U2 calculates distances d (distance 19 shown in FIG. 4) between sensor views corresponding to each line and a point P with respect to each line from the line $v_1$ to the line $v_{N+1}$ (step F2).

Next, a method for calculating the distance d will be described with reference to FIG. 10. FIG. 10 shows two arbitrary points on the line 26, points 31 and 32, that is, $I_1 = (u_1, v)$ and $I_2 = (u_2, v)$. Unit direction vector corresponding to the points 31 and 32 is unit direction vectors 34 and 35, respectively, that is, $V1 = (X1, Y1, Z1)$ and $V2 = (X2, Y2, Z2)$. Here, first, the line searching unit A2-U2 shown in FIG. 5 calculates V1 and V2 by using an equation 1 and an equation 2, $$V1 = R(v) I_1 \quad \text{(equation 1)}$$

$$V2 = R(v) I_2 \quad \text{(equation 2)}$$

where $R(v)$ is uv-XYZ coordinates transformation matrix corresponding to each line of a line sensor image. $R(v)$ is the uv-XYZ coordinates transformation information corresponding to each line of a line sensor image stored in the uv-XYZ coordinates transformation memory unit for each line A3-5.

Next, the line searching unit A2-U2 calculates the distance d (distance 19 shown in FIG. 4) between the line sensor view 17 and the point P 08 (P=(XP, YP, ZP)) by an equation 3, $$d = |\{(V1 \times V2)/|V1 \times V2|\} \cdot (P - H)| \quad \text{(equation 3)}$$

("·" means inner product, "×" means outer product.) where H=(Xh, Yh, Zh) is the photographing position 28 corresponding to the line 26 stored in the flight vehicle position/speed memory unit A3-4, V1 is the calculated unit direction vector 34, and V2 is the calculated unit direction vector 35. The distance d is calculated by the line sensor view 17 including the H=(Xh, Yh, Zh) and the calculated unit direction vectors 34 and 35.

Next, in the flowchart shown in FIG. 8, the line searching unit A2-U2 searches for a line $v_i$ corresponding to a smallest distance among the (N+1) number of calculated distances d corresponding to (N+1) number of lines (step F3). After that, the line searching unit A2-U2 allocates a minimum line number vs to $v_{i-1}$ and allocates a maximum line number ve to $v_{i+1}$ with respect to a search area in the following step (step F4). Here, the line $v_{i-1}$ and the line $v_{i+1}$ are adjacent to the line $v_i$ and are ones of N pieces of equally-spaced points.

Next, when a total number of lines included in a search area from vs to ve is larger than a predetermined threshold value M (M is an integer and larger than 0) ("No" decision in step F5), the line searching unit A2-U2 repeats processes from step F2 to step F5. On the contrary, when a total number of lines is equal to or less than M ("Yes" decision in step F5), the line searching unit A2-U2 calculates a distance d to all lines included in the search area from vs to ve and searches for a line v where a distance d is smallest (step F6). Next, the line searching unit A2-U2 supplies the line v that is determined as a line where a distance d is smallest to the most suitable line memory unit of image corresponding to a point P A3-6, as the most suitable line to a point P (step F7).

When a position/posture of a flight vehicle is rapidly changed, a distance between a sensor view corresponding to each line of a line sensor image and a point P may not show a behavior which monotonically decreases and then reaches a local minimum, and next, monotonically increases with an increase of a position coordinates (line number) of a line in the line sensor image, during a search. In the case, the line searching unit A2-U2 searches for the line v where a distance d is smallest by performing a search for all lines.

Figure 9:
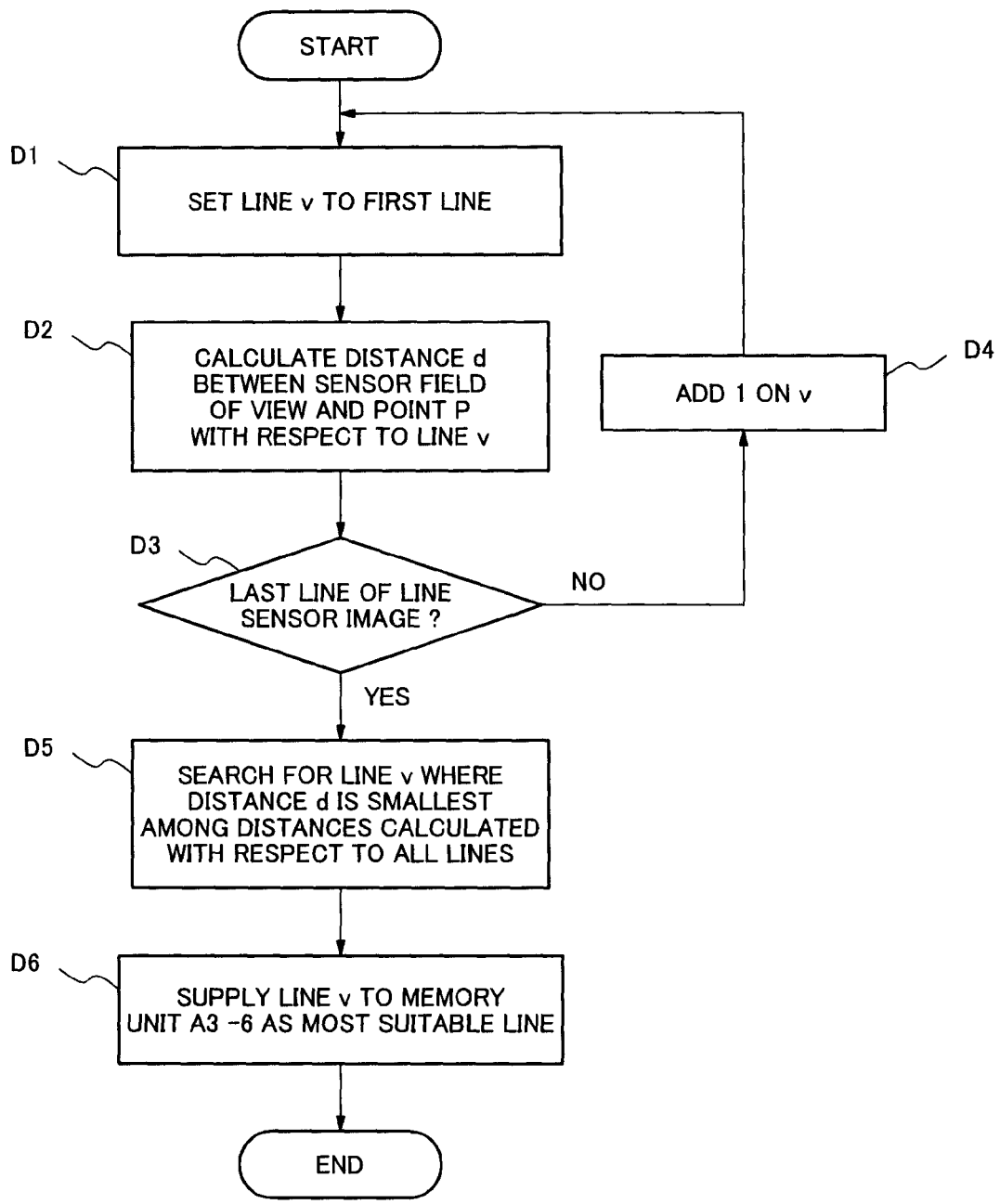
FIG. 9 is a flowchart for explaining another example of an operation of the line searching unit of the image processing apparatus shown in FIG. 5.

FIG. 9 is a flowchart for explaining another example of an operation of the line searching unit of the image processing apparatus shown in FIG. 5. An operation to search for the most suitable line is described with respect to a case when a distance between a sensor view corresponding to each line and a point P does not show a behavior which monotonically decreases and then reaches a local minimum, and next, monotonically increases with an increase of a position coordinates (line number) of a line in the line sensor image, during a search.

In a flowchart shown in FIG. 9, first, the line searching unit A2-U2 allocates the line v to 1 (step D1). The line searching unit A2-U2 calculates a distance d between a sensor view corresponding to the line v and a point P based on the equations 1 to 3 that are mentioned above (step D2). Next, the line searching unit A2-U2 checks whether or not the line v reaches a last line of a line sensor image (step D3). When the line v does not reach the last line ("No" decision in step D3), the line searching unit A2-U2 adds 1 to the line v (step D4) and returns to step D2 while keeping its state. After that, the line searching unit A2-U2 repeats processes from step D2 to D4. When the line v reaches a last line in step D3 ("Yes" decision in step D3), the line searching unit A2-U2 searches for the line v where a distance d is smallest among the distances d calculated for all lines v (step D5). The line searching unit A2-U2 supplies a value of the line v to the most suitable line memory unit of image corresponding to a point P A3-6 as the most suitable line (step D6).

Figure 11:
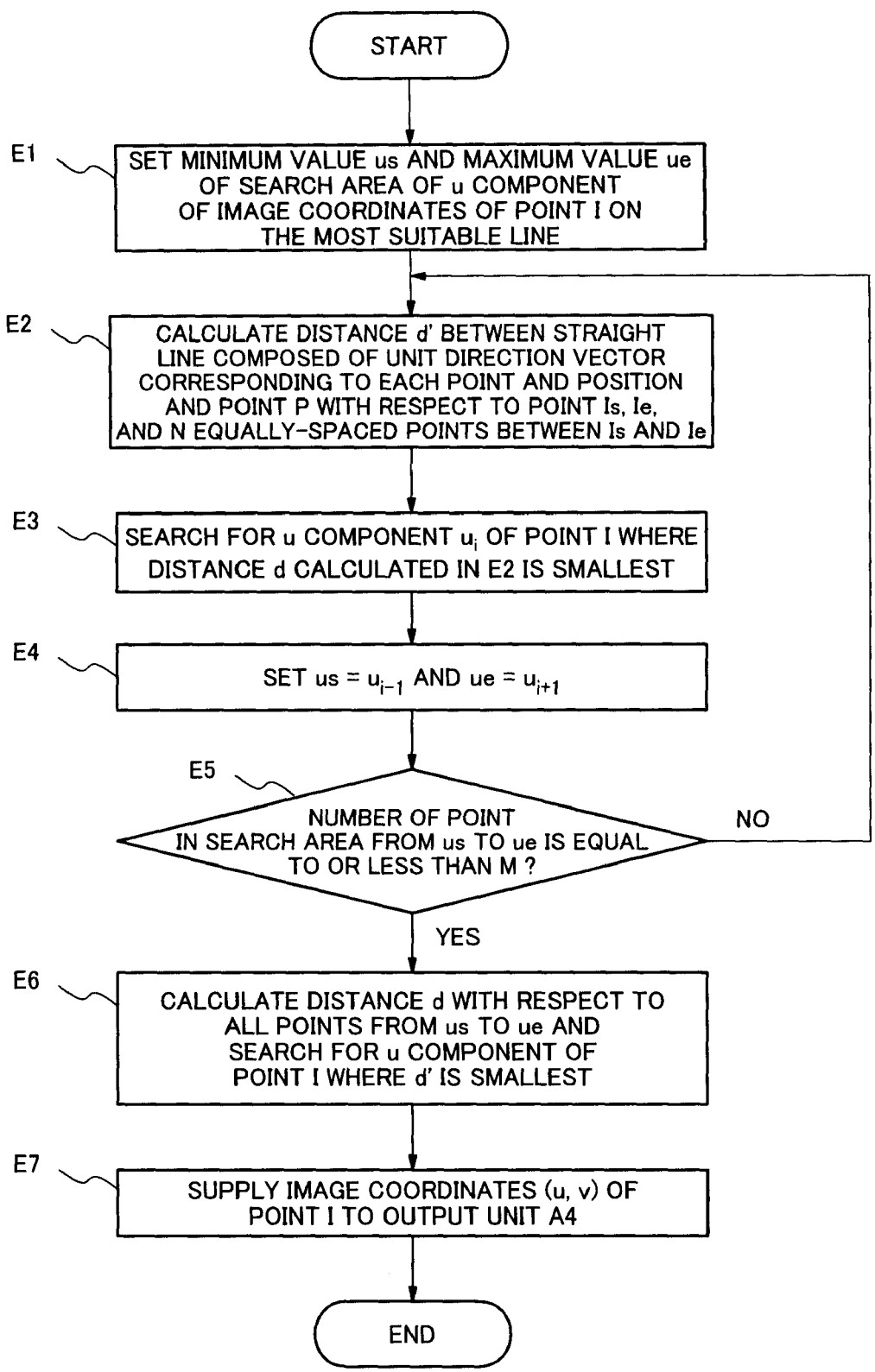
FIG. 11 is a flowchart for explaining an example of an operation of a coordinates searching unit of the image processing apparatus shown in FIG. 5.
Figure 13:
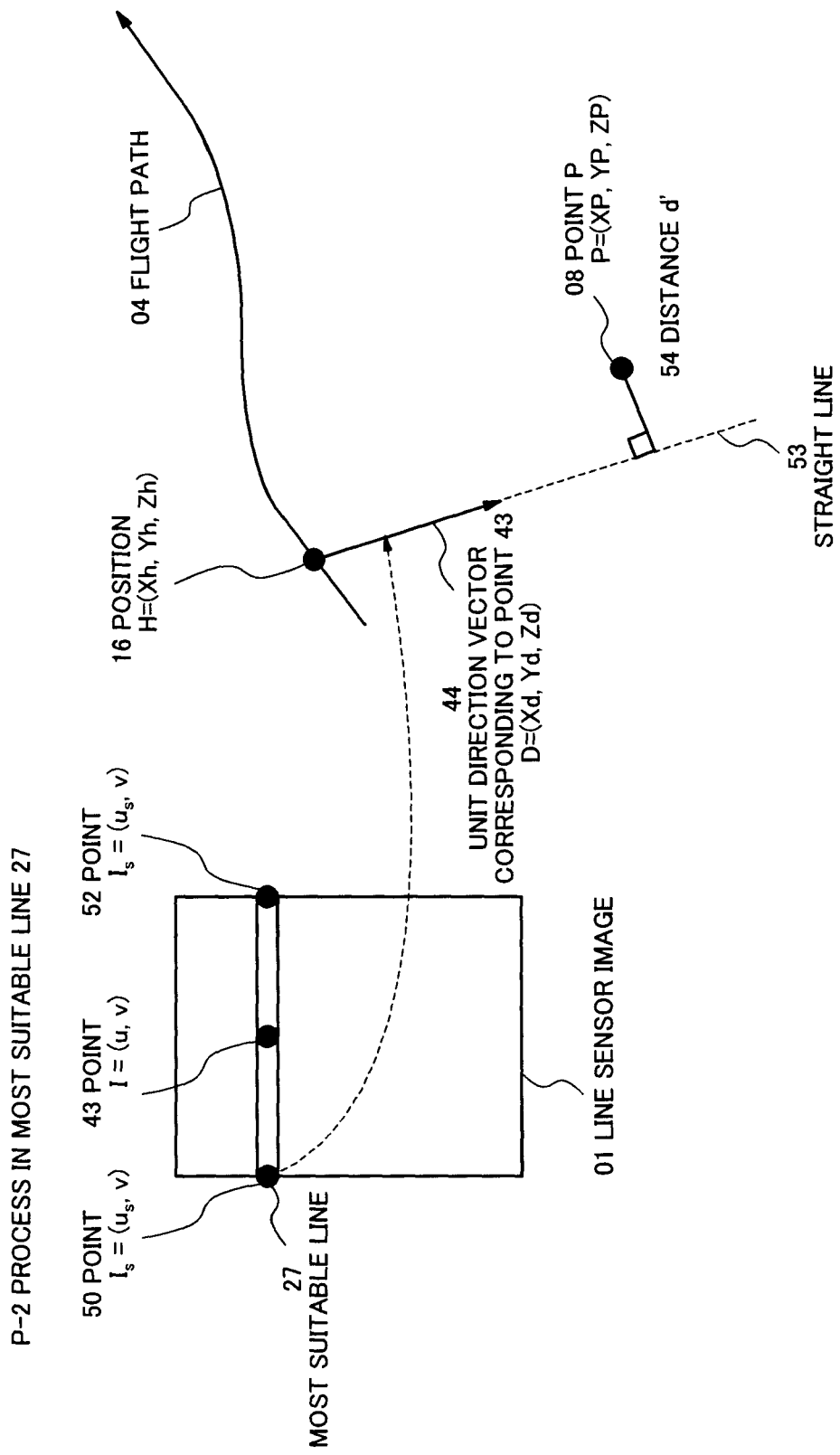
FIG. 13 is a figure for explaining an operation of a process P-2 in a most suitable line shown in FIG. 4 as an example of calculating image coordinates of a pixel on a line sensor image corresponding to a point P.

After a process of the line searching unit A2-U2 that searches for the most suitable line is completed, the coordinates searching unit A2-U3 shown in FIG. 5 performs a process to calculate an image coordinates corresponding to a point P. The coordinates searching unit A2-U3 will be in detail described with reference to FIG. 11 and FIG. 13. FIG. 11 is a flowchart for explaining an example of an operation of a coordinates searching unit A2-U3 of the image processing apparatus shown in FIG. 5. FIG. 13 is a figure for explaining an operation of a process P-2 in the most suitable line 27 shown in FIG. 4 as an example of calculating image coordinates of a pixel on a line sensor image corresponding to a point P.

In a flowchart shown in FIG. 11, first, the coordinates searching unit A2-U3 specifies, as a search target, the most suitable line 27 shown in FIG. 13 that is searched for by a process shown in FIG. 8 or FIG. 9. That is, the coordinates searching unit A2-U3 specifies an area from a minimum value us to a maximum value ue with respect to u component of image coordinates, as a search area of a point on the most suitable line 27. The coordinates searching unit A2-U3 allocates the us to 1 and allocates the ue to a maximum value of an image column (step E1). Next, the coordinates searching unit A2-U3 equally divides the search area into N areas. The u component of a point Is is $u_1$, and the u component of a point Ie is $U_{N+1}$. With respect to N pieces of equally-spaced points between the point Is and Ie, the u component of a point $I_2$ is $u_2$, the u component of a point $I_3$ is $u_3$, ... the u component of a point $I_N$ is $u_N$. Here, $u_1$ to $u_{N+1}$ have a relationship of $u_1 < U_2 < \ldots < u_N < U_{N+1}$. Points that are searched for are a point Is, a point Ie, and N pieces of equally-spaced points between the point Is and Ie, and a total number of points is N+1. The coordinates searching unit A2-U3 calculates a distance d' between a straight line composed of a unit direction vector corresponding to each point and a position, and the point P with respect to each point of the points that are searched for (step E2).

Next, a method for calculating the distance d' will be described with reference to FIG. 13. First, the coordinates searching unit A2-U3 calculates a unit direction vector 44 corresponding to a point 43 on the most suitable line 27 by an equation 4, $$D = R(v)I \quad \text{(equation 4)}$$

where I=(u, v) is the point 43 on the most suitable line 27, D=(Xd, Yd, Zd) is the unit direction vector 44 corresponding to I=(u, v), R(v) is a uv-XYZ coordinates transformation matrix corresponding to each line of a line sensor image stored in the uv-XYZ coordinates transformation information memory unit for each line A3-5.

The coordinates searching unit A2-U3 calculates a distance d' (distance 54 shown in FIG. 13) between a straight line 53 and the point P 08, that is, P=(XP, YP, ZP), by an equation 5, $$d' = |(P-H) - \{D \cdot (P-H)\}D| \quad \text{(equation 5)}$$

where H=(Xh, Yh, Zh) is the photographing position 16 corresponding to the most suitable line 27 stored in the flight vehicle position/speed memory unit for each line A3-4. The straight line 53 is composed of H=(Xh, Yh, Zh) and the unit direction vector 44 calculated by the equation 4.

In the flowchart shown in FIG. 11, next, the coordinates searching unit A2-U3 searches for u component $u_i$ of a point $I_i$ where a distance is smallest among the (N+1) number of distances d' calculated at N+1 number of points (step E3). After that, the coordinates searching unit A2-U3 allocates a minimum value us to u component $u_{i-1}$ of the point $I_{i-1}$ and a maximum value ue to u component $u_{i+1}$ of the point $I_{i+1}$ with respect to a search area in the following step (step E4). Here, the point $I_{i-1}$ and $I_{i+1}$ are adjacent to the point Ii and are ones of N pieces of equally-spaced points.

Next, when a total number of points included in a search area from us to ue is larger than a predetermined threshold value M (M is an integer and larger than 0) ("No" decision in step E5), the coordinates searching unit A2-U3 repeats processes from step E2 to step E5. On the contrary, when a total number of a point is equal to or less than M ("Yes" decision in step E5), the coordinates searching unit A2-U3 calculates distances d' to all points included in the search area from us to ue, and searches for u component of a point I where a distance d' is smallest (step E6). The coordinates searching unit A2-U3 supplies image coordinates (u, v) of the point I that is searched for as a point where the distance d' is smallest to the output apparatus A4 (step E7).

When a position/posture of a flight vehicle is rapidly changed, a distance d' between a straight line composed of a unit direction vector corresponding to each point of the most suitable line and a photographing position, and the point P may not show a behavior which monotonically decreases and then reaches a local minimum, and next, monotonically increases with an increase of a position coordinates (point number) of a point in the line, during a search. In the case, the coordinates searching unit A2-U3 searches for u component of the point I where a distance d' is smallest by performing a search for all points.

Figure 12:
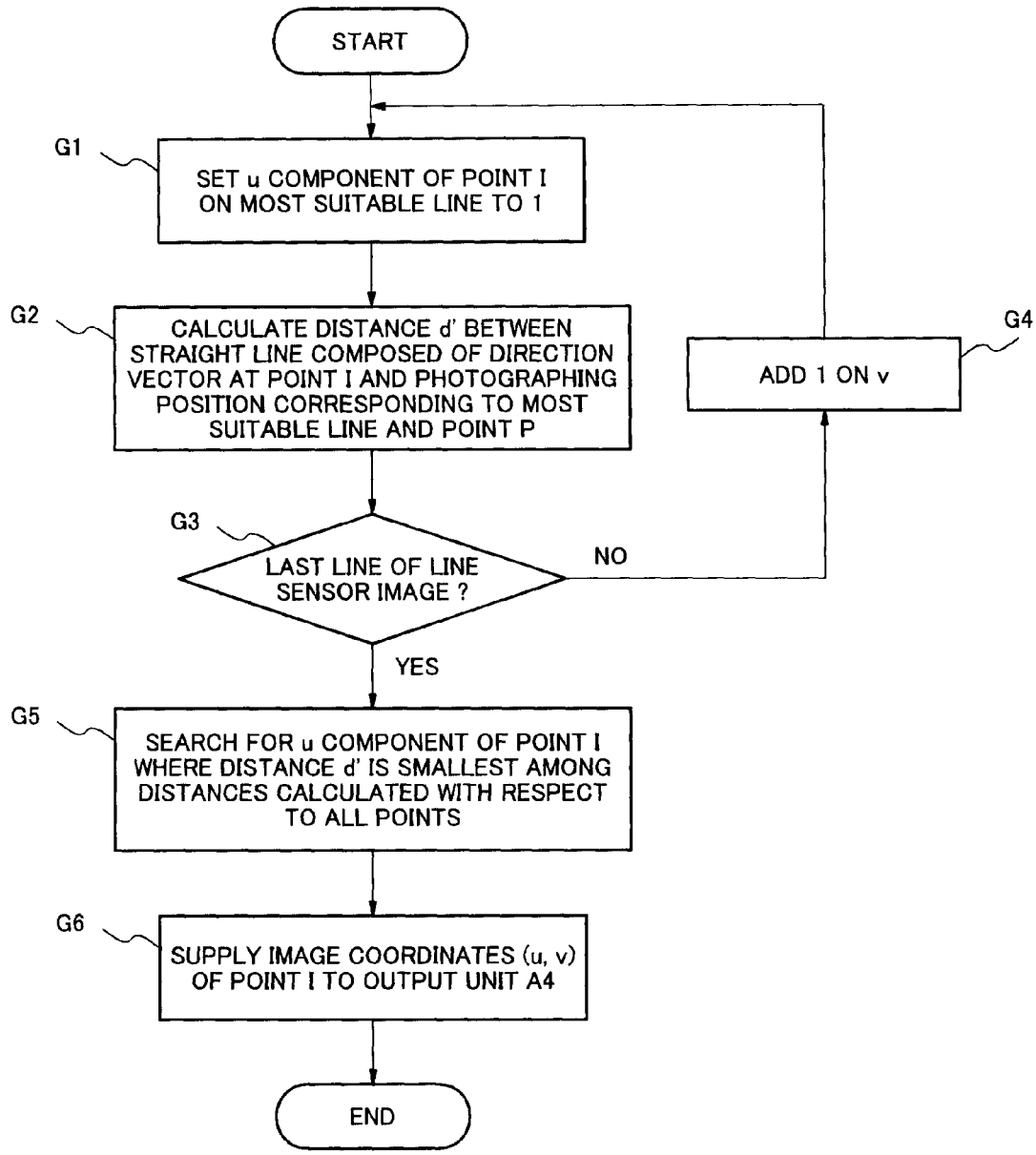
FIG. 12 is a flowchart for explaining another example of an operation of the coordinates searching unit of the image processing apparatus shown in FIG. 5.

FIG. 12 is a flowchart for explaining another example of an operation of the coordinates searching unit of the image processing apparatus shown in FIG. 5. The flowchart shows an operation to search for image coordinates of a pixel on a line sensor image in a case when a distance d' between a straight line composed of a unit direction vector corresponding to each point of the most suitable line and a photographing position, and the point P does not show a behavior which monotonically decreases and then reaches a local minimum, and next, monotonically increases with an increase of a position coordinates (point number) of a point in the line during a search.

In a flowchart shown in FIG. 12, first, the coordinates searching unit A2-U3 allocates u component of a point I to the most suitable line to 1 (step G1). The coordinates searching unit A2-U3 calculates a distance d' between a straight line composed of a unit direction vector corresponding to the point I and a photographing position corresponding to the most suitable line and the point P by the equation 5 (step G2). Next, the coordinates searching unit A2-U3 checks whether or not the u component of the point I reaches a final column of a line sensor image (step G3). When the u component of the point I does not reach a final column ("No" decision in step G3), the coordinates searching unit A2-U3 adds 1 to u (step G4) and then returns to step G2 while keeping its state. After that, the coordinates searching unit A2-U3 repeats processes from step G2 to G4. When the u component of the point I reaches a final column in step G3 ("Yes" decision in step G3), the coordinates searching unit A2-U3 searches for the u component of the point I where the distance d' is smallest among the distances calculated at all of the point I (step G5). A value of image coordinates (u, v) of the point I that is searched for is supplied to the output apparatus A4 (step G6).

As mentioned above, an image processing apparatus of the exemplary embodiment can calculate image coordinates of a pixel on a line sensor image corresponding to a point P at high speed. That is because a distance between the point P that is searched for as the most suitable line corresponding to the point P in the line searching unit U2 and a sensor view for each line of a line sensor image shows a behavior which monotonically decreases and then reaches a local minimum, and next, monotonically increases with an increase of a position coordinates (point number) of a point in the line during a search. Also, that is because a distance between a point P that is searched for in the coordinates searching unit U3 shown in FIG. 3 as image coordinates of a pixel on a line sensor image corresponding to a point P, that is image coordinates of a point on the most suitable line, and a straight line composed of a unit direction vector at each point of the most suitable line on the line sensor image and a photographing position generally shows a behavior which monotonically decreases and then reaches a local minimum, and next, monotonically increases with an increase of a position coordinates (point number) of a point in the line during a search. A high-speed processing algorithm can be applied by using the above behavior in which those distances monotonically decreases and then reaches a local minimum, and then monotonically increases during a search.

Additionally, the exemplary embodiment can be applied to various application such as an aerial triangulation processing and an orthoimage creation in a line sensor image. A processing time can be shortened by limiting an optimal search range of a stereo matching in a line sensor image and searching for a matching point in the range.

Other Exemplary Embodiments of the Present Invention

Figure 14:
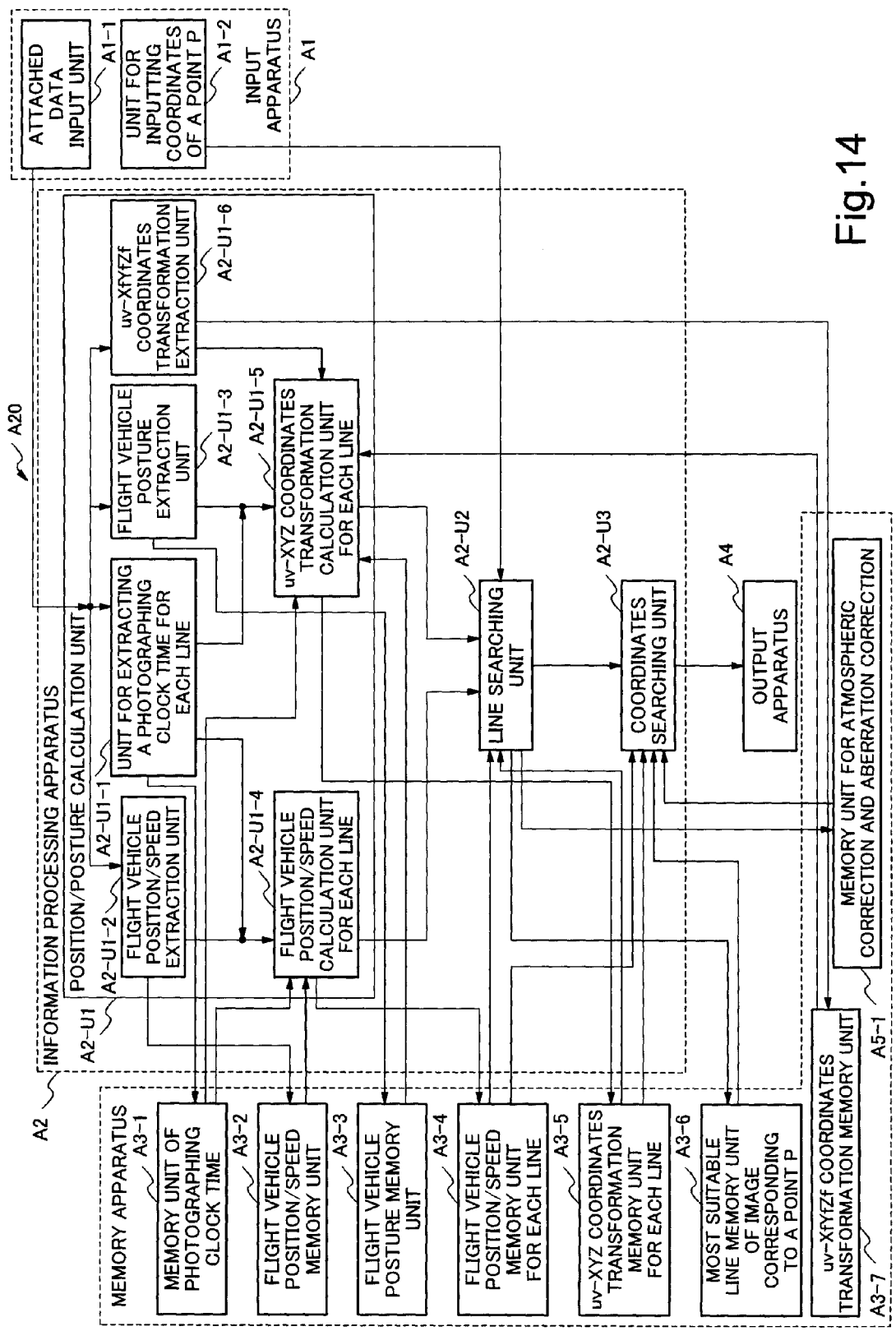
FIG. 14 is a block diagram showing an example of a detailed structure of an image processing apparatus that is different from the image processing apparatus shown in FIG. 5.

Next, another exemplary embodiment of the present invention will be described with reference to FIG. 14. FIG. 14 is a block diagram showing an example of a detailed structure of an image processing apparatus that is different from the image processing apparatus shown in FIG. 5. Referring to FIG. 14 showing an image processing apparatus A20, it is clear that an image processing apparatus of the exemplary embodiment is similar to an image processing apparatus A10 shown in FIG. 5. An image processing apparatus of the exemplary embodiment comprises at least an input apparatus A1 such as a keyboard, etc., an information processing apparatus A2 which is operated by a program control, a memory apparatus A5 which memorizes information and an output apparatus A4 such as a display apparatus, etc.

However, in a case of the image processing apparatus A20 of the exemplary embodiment, the memory apparatus A5 has a configuration which is the same as that of the memory apparatus A3 in the image processing apparatus A10 shown in FIG. 5 and further includes a memory unit for atmospheric correction and aberration correction A5-1. The memory unit for atmospheric correction and aberration correction A5-1 preliminarily memorizes information such as a value of a parameter in relation to a model formula of an atmospheric correction and an aberration correction when photographing a ground surface from a flight vehicle. The information are used in the line searching unit A2-U2 which searches for the most suitable line of an image corresponding to a point P shown in FIG. 10 and used in the coordinates searching unit A2-U3 which calculates coordinates of an image corresponding to a point P shown in FIG. 13.

The line searching unit A2-U2 shown in FIG. 10 incorporates a model formula of an atmospheric correction/aberration correction in a transformation matrix R(v) which is used when calculating a distance d between a sensor view in a line v and a point P in step F2 shown in FIG. 8 and step D2 shown in FIG. 9. Therefore, the line searching unit A2-U2 can calculate more correct distance d to which an atmospheric correction and an aberration correction are applied.

Additionally, the coordinates searching unit A2-U3 shown in FIG. 13 incorporates a model formula of an atmospheric correction/aberration correction in a transformation matrix R(v) which is used when calculating a direction vector at a point u on the most suitable line in step E2 shown in FIG. 11 and step G2 shown in FIG. 12. Therefore, the coordinates searching unit A2-U3 can calculate more correct distance d' to which an atmospheric correction and an aberration correction are applied.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

While this invention has been described in connection with certain preferred exemplary embodiments, it is to be understood that the subject matter encompassed by way of this invention is not to be limited to those specific exemplary embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. An image processing method for performing a processing of a line sensor image which is continuously taken by a line sensor installed on a flight vehicle, comprising:
   calculating first coordinates transformation information between an image coordinates system and a three-dimensional reference coordinates system for each line of the line sensor image;
   searching the most suitable line on the line sensor image corresponding to a position whose three-dimensional position is known in the three-dimensional reference coordinates system as known position, based on information of the known position, information about the three-dimensional position and the speed of the flight vehicle for each line of the line sensor image, and the first coordinates transformation information; and
   searching a position of a pixel on the line sensor image corresponding to the known position, based on information about the most suitable line, the information about the three-dimensional position and the speed of the flight vehicle for each line of the line sensor image, and the first coordinates transformation information.

2. The image processing method according to claim 1, wherein
   the first coordinates transformation information is calculated using information of a photographing clock time for each line of the line sensor image, flight vehicle posture information for each predetermined time interval, and second coordinates transformation information between the image coordinates system and a flight vehicle coordinates system.

3. The image processing method according to claim 2, wherein
   the information of the photographing clock time, the flight vehicle posture information and the second coordinates transformation information are extracted from attached data that is attached to the line sensor image.

4. The image processing method according to claim 2, wherein
   a plurality of pieces of flight vehicle posture information in a time which is close to the photographing clock time for each line of the line sensor image are extracted from the flight vehicle posture information, and
   wherein third coordinates transformation information between each of image coordinates system and the three-dimensional reference coordinates system are calculated based on the plurality of extracted flight vehicle posture information and the second coordinates transformation information, and wherein the first coordinates transformation information is obtained by an interpolation processing based on each of the calculated third coordinates transformation information.

5. The image processing method according to claim 3, wherein
   information about the three-dimensional position and the speed of the flight vehicle for each line of the line sensor image is calculated based on the information of the photographing clock time for each line of the line sensor image and predetermined information about the three-dimensional position and the speed of the flight vehicle for each predetermined time interval.

6. The image processing method according to claim 5, wherein
   the predetermined information about the three-dimensional position and the speed of the flight vehicle for each predetermined time interval is extracted from the attached data that is attached to the line sensor image.

7. The image processing method according to claim 5, wherein
   a plurality of pieces of information about the three-dimensional position and the speed of the flight vehicle in a time which is close to the photographing clock time for each line of the line sensor image are extracted from the information about the three-dimensional position and the speed of the flight vehicle for each predetermined time interval, and wherein information about the three-dimensional position and the speed of the flight vehicle for each line of the line sensor image at the photographing time to be referred to is obtained by an interpolation processing based on the plurality of pieces of the extracted information about the three-dimensional position and the speed of a flight vehicle.

8. The image processing method according to claim 2, wherein
   when a position/posture of the line sensor differs from that of the flight vehicle including the line sensor, the flight vehicle posture information or the information about the three-dimensional position and the speed of the flight vehicle for each predetermined time interval is transformed to coordinates of a position/posture of the line sensor to be referred to.

9. The image processing method according to claim 2, wherein
   when searching for the most suitable line on the line sensor image corresponding to the known position, a line sensor view corresponding to each line of the line sensor image which is calculated based on the information about the three-dimensional position and the speed of the flight vehicle for each line of the line sensor image and the second coordinates transformation information is processed as a plane, a distance between each of the planes and the known position is calculated, and a line of the line sensor image that corresponds with a plane where the distance is smallest is determined as the most suitable line on the line sensor image corresponding to the known position.

10. The image processing method according to claim 9, wherein
    when calculating the distance between the plane corresponding to each line of the line sensor image and the known position, a calculated distance is corrected based on at least one of information for atmospheric correction and information for aberration correction which are correction information between a flight vehicle and a surface of the object at a time when the line sensor image is taken.

11. The image processing method according to claim 9, wherein
when calculating the distance between the plane corresponding to each line of the line sensor image and the known position, lines of the line sensor image are divided into some groups in which one or more than one lines are included, a distance between a plane corresponding to one of lines that is arbitrarily selected as a representative line of each group and the known position is calculated,
a group having the smallest distance among said calculated distances that represents each group is selected, and,
a distance between a plane corresponding to each line belonging to the selected group and the known position is calculated, and a line of the line sensor image that corresponds with a plane where the calculated distance is smallest among the selected groups is determined as the most suitable line on the line sensor image corresponding to the known position.

12. The image processing method according to claim 11, wherein
when selecting a group having a smallest distance, if the number of lines of the line sensor image belonging to a selected group is larger than a predetermined threshold value, lines of the line sensor image belonging to a selected group are divided into some groups each of which includes one or more than one lines, a distance between a plane corresponding to one of lines that is arbitrarily selected as a representative line of each group and the known position is calculated, a process in which a group having the smallest distance among the calculated distances that represent each group is selected is repeated until the number of lines of the line sensor image belonging to a group is equal to or less than the threshold value.

13. The image processing method according to claim 1, wherein
when searching for image coordinates of a pixel on the line sensor image corresponding to the known position, a distance between a straight line including a unit direction vector corresponding to each pixel on the most suitable line on the line sensor image and a photographing position and the known position is calculated and a pixel where the calculated distance is smallest is determined as image coordinates of a pixel on the line sensor image corresponding to the known position.

14. The image processing method according to claim 13, wherein
when calculating a distance between a straight line including a unit direction vector corresponding to each pixel on the most suitable line and a photographing position and the known position, the calculated distance is corrected based on at least one of information for atmospheric correction or information for aberration correction which are correction information between a flight vehicle and a surface of the object at a time when a line sensor image is taken.

15. The image processing method according to claim 13, wherein
when calculating a distance between a straight line including a unit direction vector corresponding to each pixel on the most suitable line and a photographing position, and the known position, pixels on the most suitable line is divided into some groups each of which includes one or more than one pixels, a distance between a plane corresponding to one of pixels that is arbitrarily selected as a representative pixel of each group and the known position is calculated, a group having the smallest distance among the calculated distances that represents each group is selected and a distance between a straight line corresponding to each pixel belonging to the selected group and the known position is calculated, and a pixel on the most suitable line that corresponds with a straight line where the calculated distance is smallest among the selected groups is determined as image coordinates of a pixel on the line sensor image corresponding to the known position.

16. The image processing method according to claim 15, wherein
if the number of pixels on the most suitable line belonging to the selected group is larger than a predetermined threshold value when selecting the group having the smallest distance, the number of pixels on the most suitable line of the selected group is divided into some groups each of which includes the arbitrary number of pixels, a distance between a plane corresponding to one of pixels that is arbitrarily selected as a representative pixel of each group and the known position is calculated,
a process which selects a group having the smallest distance among the calculated distances that represent each group is repeated until the number of pixels on the most suitable line belonging to a group is equal to or less than the threshold value.

17. An image processing apparatus which performs a processing of a line sensor image in which a surface of an object is continuously taken by a line sensor installed on a flight vehicle, comprising a processor:
a position/posture calculation unit which calculates first coordinates transformation information that is transformation information between an image coordinates system and a three-dimensional reference coordinates system for each line of the line sensor image;
a line searching unit which searches the most suitable line on the line sensor image corresponding to a position whose three-dimensional position is known in the three-dimensional reference coordinates system as known position based on a position information on the known position, information about the three-dimensional position and the speed of the flight vehicle for each line of the line sensor image, and the first coordinates transformation information; and
a coordinates searching unit which searches for a position of a pixel on the line sensor image corresponding to the known position using information of the most suitable line, information about the three-dimensional position and the speed of the flight vehicle for each line of the line sensor image, and the first coordinates transformation information.

18. An image processing apparatus which performs a processing of a line sensor image in which a surface of the earth is continuously taken by a line sensor mounted on a flight vehicle, comprising:
position/posture calculation means which calculate first coordinates transformation information that is transformation information between an image coordinates system and a three-dimensional reference coordinates system for each line of the line sensor image;
line searching means which search for the most suitable line on the line sensor image corresponding to a position whose three-dimensional position is known in a three-dimensional reference coordinates system (hereinafter referred to as "known position") based on a position information on the known position, information about a three-dimensional position and a speed of the flight vehicle for each line of the line sensor image, and the first coordinates transformation information; and coordinates searching means which search for a position of a pixel on the line sensor image corresponding to the known point using information of the most suitable line, information about a three-dimensional position and a speed of the flight vehicle for each line of the line sensor image, and the first coordinates transformation information.

19. A computer-executable stored on a non-transitory computer-readable medium for performing a processing of a line sensor image in which a surface of the earth is continuously taken by a line sensor mounted on a flight vehicle, comprising:

calculating first coordinates transformation information that is transformation information between an image coordinates system and a three-dimensional reference coordinates system for each line of a line sensor image;

searching for the most suitable line on a line sensor image corresponding to said known point using position information on a point whose three-dimensional position is known in the three-dimensional reference coordinates system as know position, information about the three-dimensional position and the speed of a flight vehicle for each line of the line sensor image, and said first coordinates transformation information; and searching for a position of a pixel on a line sensor image corresponding to said known point using information of said most suitable line, information about the three-dimensional position and the speed of the flight vehicle for each line of said line sensor image, and said first coordinates transformation information.

* * * * *

UNITED STATES PATENT AND TRADEMARK OFFICE
CERTIFICATE OF CORRECTION

PATENT NO. : 7,903,840 B2
APPLICATION NO. : 11/842679
DATED : March 8, 2011
INVENTOR(S) : Hiroshi Oyama and Makoto Maruya It is certified that error appears in the above-identified patent and that said Letters Patent is hereby corrected as shown below:

In the Claims:

Column 18, Line 30: In Claim 17, delete "comprising a processor:" and insert
-- comprising: a processor; --

Column 19, Line 10: In Claim 19, delete "computer-executable" and insert
-- computer-executable image processing program --

Column 20, Line 5: In Claim 19, delete "know" and insert -- known --

Signed and Sealed this
Sixth Day of August, 2013

Teresa Stanek Rea
*Acting Director of the United States Patent and Trademark Office*